United States Patent [19]

Hayashi et al.

[11] 4,139,297
[45] Feb. 13, 1979

[54] ELECTROPHOTOGRAPHIC COPYING APPARATUS WITH NOVEL EXPOSURE SLIT MEANS

[75] Inventors: Masamichi Hayashi, Aichi; Masami Nakane, Toyokawa, both of Japan

[73] Assignee: Minolta Camera Kabushiki Kaisha, Osaka, Japan

[21] Appl. No.: 799,311

[22] Filed: May 23, 1977

Related U.S. Application Data

[63] Continuation of Ser. No. 643,951, Dec. 23, 1975, abandoned.

[30] Foreign Application Priority Data

Jan. 13, 1975 [JP] Japan .................................. 50-6841

[51] Int. Cl.² ................................................ G03G 15/28
[52] U.S. Cl. ........................................... 355/8; 355/11
[58] Field of Search ................... 355/3 R, 4, 8, 11, 71

[56] References Cited

U.S. PATENT DOCUMENTS

| | | | |
|---|---|---|---|
| 3,062,108 | 11/1962 | Mayo | 355/8 |
| 3,105,425 | 10/1963 | Cerasani et al. | 355/11 X |
| 3,266,366 | 8/1966 | Hunt | 355/11 X |
| 3,926,518 | 12/1975 | Berry et al. | 355/8 |

Primary Examiner—R. L. Moses
Attorney, Agent, or Firm—Wenderoth, Lind & Ponack

[57] ABSTRACT

An electrophotographic copying apparatus incorporating therein an improved slit control device, which control device includes a blade member extending across the width of a photoreceptor drum. The width of the blade member in a direction normal to the axis of the photoreceptor drum is so arranged as to gradually increase toward its opposite ends in comparison with a generally uniform width in its central portion so as to form a slit which is wide in the central portion and gradually narrowed toward opposite ends, by which arrangement a sharp and definite image of an original is formed even on a photoreceptor drum of small diameter.

8 Claims, 13 Drawing Figures

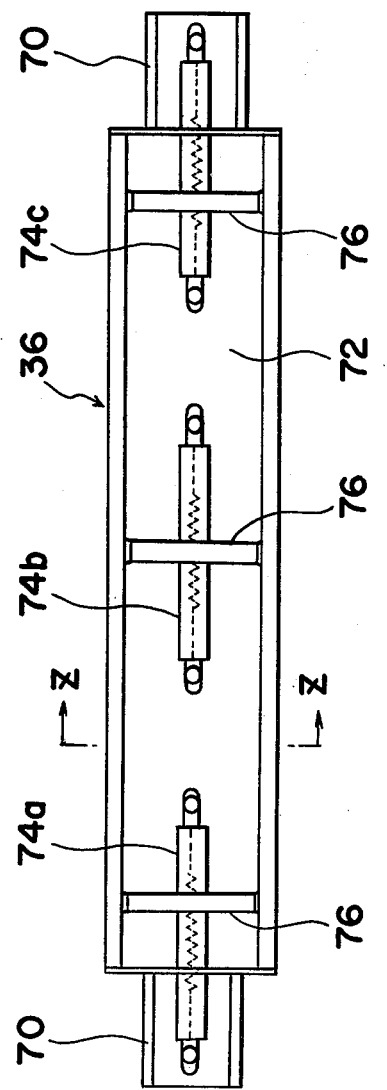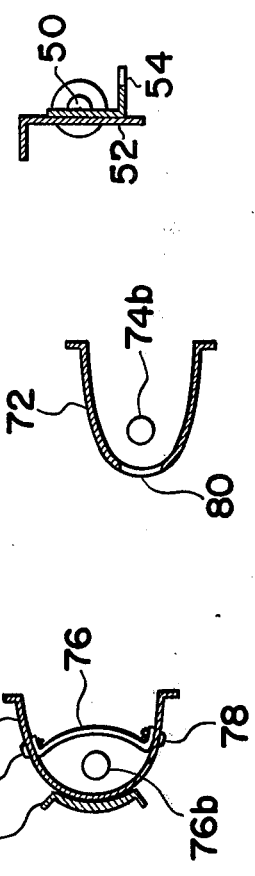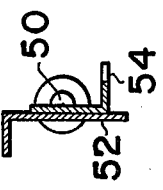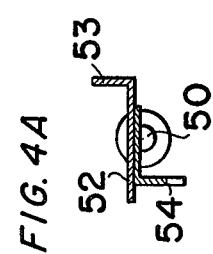

ELECTROPHOTOGRAPHIC COPYING APPARATUS WITH NOVEL EXPOSURE SLIT MEANS

This is a continuation of application Ser. No. 643,951, now abandoned, filed Dec. 23, 1975.

The present invention relates to an electrophotographic copying apparatus and more particularly, to a slit exposure control device for use in an electrophotographic copying apparatus.

Commonly, in an electrophotographic copying apparatus of the slit exposure type, the light image of an original placed on a transparent platform and illuminated by a light source is projected onto a rotating photoreceptor drum having therearound a photoconductive surface or light receiving surface on a conductive backing, through a slit disposed adjacent to the photoreceptor surface, via an optical system having a lens and mirror assembly which is provided between the platform and the photoreceptor drum, while either the transparent platform or the optical system is adapted to reciprocate in timed relation to the rotation of the photoreceptor drum for scanning the original on the platform, thus an electrostatic latent image of the original being formed on the preliminarily charged photoreceptor surface in a known manner. In such a conventional slit exposure type system, the pattern of the original in the form of light rays is sequentially transferred section by section onto the photoconductive surface of the rotating drum through a slit having a rectangular shape which extends across the width of the drum. The width of such a conventional slit is normally adjustable to effect exposure with an amount of light corresponding to the contrast in the original between the dark and bright portions thereof. When the contrast therebetween is high, the width of the slit may be comparatively narrow, and when the contrast therebetween is low, the width of the slit may be comparatively wide. In the case of a narrow slit, the image light projected on the drum surface may be in comparatively good condition.

However due to the curvature of the photoreceptor, i.e., the drum surface, there has been a disadvantage in the case of using a wide slit that the image projected through the slit onto the photoreceptor surface becomes indefinite or out of focus due to the reduction of the resolving power as described hereinbelow.

Referring to FIGS. 1 and 2, showing the principle of image formation by slit exposure, when a light path B along an optical axis X of a lens L disposed between an original P and a photoreceptor drum R, and light paths A and C passing through the lens L, but each being at a predetermined angle with respect to the optical axis X are present, the image of the original P formed by the lens L on the photoreceptor surface Ra of the drum R by light rays from the original P through the light path B along the optical axis X is gradually caused to become out of focus in the direction of the width W of slit S, i.e., in the direction from a point B' where the light axis X meets the photoreceptor surface Ra toward points on opposite sides of B' B", when such image formed on the photoreceptor surface Ra is considered to be an aggregation of a line images B"-B'-B", because of difference in distances between the flat surface of the original P and the round photoreceptor surface Ra of the drum R. It is to be noted here, however, that the resultant image of the original being formed on the photoreceptor surface R following the rotation of the drum R, i.e., the image directly utilized for subsequent transfer is continuously overlapping such line image B"-B'-B".

On the other hand, the portion of the image formed on the photoreceptor surface Ra through the lens L along each of the light paths A and C is constituted by part of an ellipse formed by the intersection with the photoreceptor surface Ra of an extension of the light path A or C, while each of such ellipses is a projection of a line image A"-A'-A" or C"-C'-C" through the light paths A or C in an inclined plane, and the resultant image, i.e., the image directly used for transfer, formed on the photoreceptor surface Ra following the rotation of the drum R is constituted by the locus of continuous movement of part of the ellipse having the line image A"-A'-A" or C"-C'-C" as an envelope. Accordingly, since width α represents the amount of curvature of the arcuate line image A"-A'-A" or C"-C'-C", not only are the resultant images formed on the photoreceptor surface for transfer rendered indefinite, but in some cases distortion of the line images in the direction in which the exposure proceeds or even disappearance of such line images due to reduction of light ray density due to excessively large dispersion of light flux will result, which trend is especially conspicuous when a photoreceptor drum of small diameter which has recently been developed for a compact size copying apparatus is employed, thus affecting adversely the quality of the copied images.

Accordingly, an essential object of the present invention is to provide an electrophotographic copying apparatus having an improved slit exposure control device in which the width of slit is gradually narrowed towards its opposite end portions with respect to the width thereof at central portion corresponding to an optical axis of the optical system for obtaining clear and definite copied images, with substantial elimination of the disadvantages inherent in the conventional slit exposure devices.

Another important object of the present invention is to provide a slit exposure control device of the above described type which is best suited to an electrophotographic copying apparatus employing a photoreceptor-drum having a small diameter.

A further object of the present invention is to provide a slit exposure control device of the above described type which is accurate and simple in construction, and can be manufactured at a low cost.

According to a preferred embodiment of the present invention, the copying apparatus is provided with a slit exposure control device in which a slit control member is pivotally provided in a position adjacent to the photoreceptor surface. The slit control member includes a first blade of rectangular shape extending across the width of the photoreceptor drum in a direction parallel to the photoreceptor surface and fixedly mounted on a shaft pivotally supported by a shield frame which surrounds the light path, and a second blade extending outwardly at right angles from the surface of the first blade in a position adjacent to one edge of the first blade. The forward edge of the second blade is so shaped that the width of slit formed between said forward edge and the wall of the shield frame is uniform at the center portion, while opposite end portions of the slit are gradually narrowed, whereby the image light projected on the drum surface is narrowed toward the opposite end portions, whereby a clear and definite image of an original is formed on the surface of the photoreceptor drum.

Although this narrowed image light may reduce the light intensity, which might decrease the contrast between the dark and bright portion in the copied paper, such reduction of light intensity can be easily compensated for by adjusting the light source member.

These and other objects and features of the present invention will become apparent from the following description taken in conjunction with preferred embodiments thereof with reference to the accompanying drawings, in which.

Figure 4:
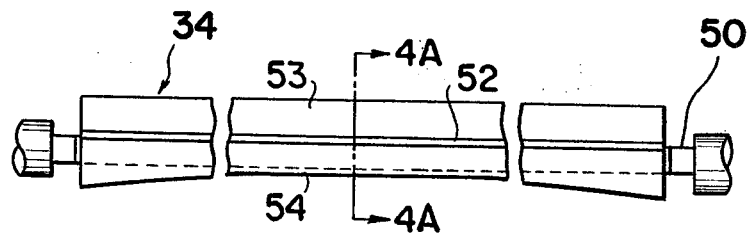
FIGS. 4 and 5 are front and top plan views, partly broken and on an enlarged scale, of the slit control member viewed from direction IV and V in FIG. 3 and which is to be incorporated in the copying apparatus of FIG. 3.
Figure 5:
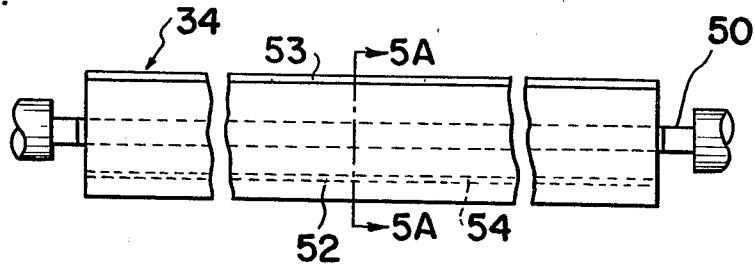

FIGS. 4a and 5a are sectional views along lines 4a—4a and 5a—5a of FIGS. 4 and 5, respectively.

Figure 6:
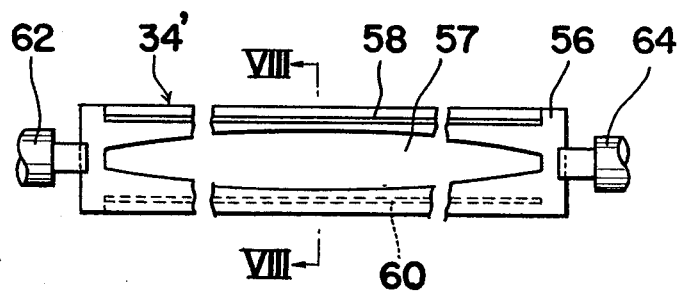
Figure 7:
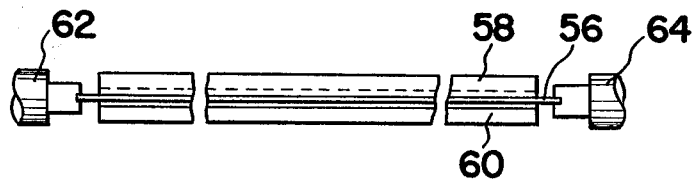
Figure 8:
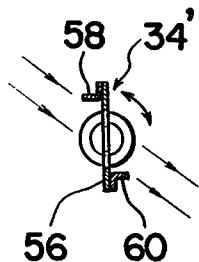

FIGS. 6 and 7 are similar views to FIGS. 4 and 5, but particularly show a modification thereof;

FIG. 8 is a cross sectional view taken along the line VIII — VIII of FIG. 6;

FIG. 9 is a front view of a light source member which may be employed in association with the slit exposure control device of the invention;

FIG. 10 is a cross sectional view taken along the line X — X of FIG. 9; and

FIG. 11 is a similar view to FIG. 10, but shows a modification thereof.

Before the description of the present invention proceeds, it is to be noted that like elements are designated by like reference numerals throughout the several views of the attached drawings.

Figure 1:
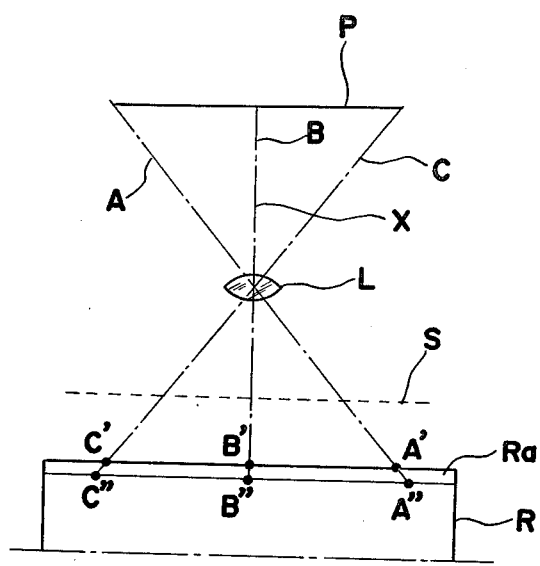
FIG. 1 is an elevation diagram of the manner in which a light image is projected on a drum of a copying apparatus.
Figure 2:
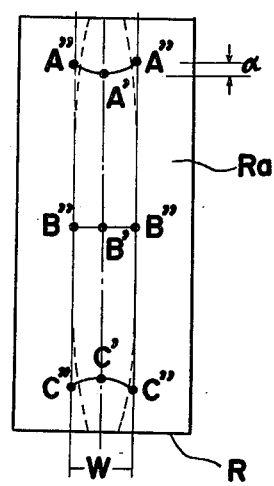
FIG. 2 is a plan diagram of the drum of FIG. 1.
Figure 3:
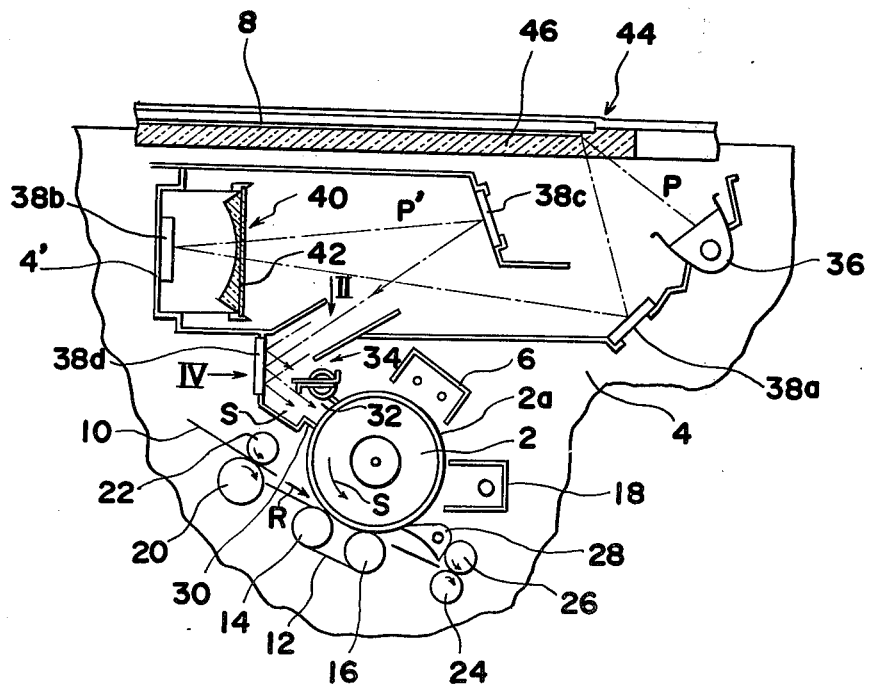
FIG. 3 is a sectional side view, partly broken away, of an electrophotographic copying apparatus in which the slit control device of the invention can be incorporated.

Referring to FIG. 3, the electrophotographic copying apparatus in which the slit exposure control device of the invention can be incorporated, includes a photoreceptor 2 having a photoconductive surface 2a therearound, and rotatably mounted on a shaft journaled in a frame 4 of the apparatus housing to rotate in the direction indicated by the arrow s to cause the photoreceptor surface 2a sequentially to pass a plurality of processing stations. For a general understanding of the copying apparatus, these processing stations in the path of the movement of the photoreceptor surface 2a can be described as follows:

a charging station, whereat the photoreceptor surface 2a is electrostatically charged with a corona charger 6 provided adjacent to said drum 2 and facing toward the photoreceptor surface 2a; an exposure station whereat image light or a radiation pattern of the original to be copied is projected onto the photoreceptor surface 2a to transfer the pattern by an electrostatic charge in the exposed areas thereof and thereby forming an electrostatic latent image of the original 8 to be copied on the photoreceptor surface 2a; a transfer station whereat a transfer material or a sheet of copying paper 10 is fed in the direction of arrow R, and pressed against the photoreceptor surface 2a by a belt 12 supported by a pair of rolls 14 and 16 to receive the electrostatic latent image on the copying paper 10; and an erasing station whereat residual charge on the photoreceptor surface 2a is erased with an eraser 18 provided adjacent to the drum surface.

On the left and right sides of the transfer station, a pair of feeding rolls 20 and 22 and a pair of transportation rolls 24 and 26 are provided, respectively, for transfer of the copying paper 10. The copying paper 10 which is fed into the transfer station and comes out therefrom is separated from the photoreceptor surface 2a by a separation claw 28 provided adjacent to the right side of the transfer station. The copying paper 10 having the latent image thereon which is discharged from the transfer station is subsequently fed into a developing station (not shown) for development of the latent image into a visible toner powder image, and then into a fixing station (not shown) for being discharged out of the apparatus in a known manner.

At the exposure station wherein the slit exposure control device of the invention is included, a shield frame 30 forming a light path 32 is adapted to protect the photoreceptor surface 2a from external light. On the upper side of the light path 32, said shield frame 30 is provided with a slit control member 34 which is pivotally supported, for example, in a wall of said shield frame 30, which will be described in more detail later. The upper end of this shield frame 30 is open to receive image light from an original 8 to be copied.

In the upper portion of the apparatus above the drum 2, there is provided an optical system including a light source member 36 which is fixedly provided on a optical frame 4' and emitting light rays therefrom as shown by chain line P in FIG. 3, for illuminating the original 8 to be copied. The light rays P which are reflected from the surface of the original 8 and forming the image light P' are further reflected by a series of mirrors 38a, 38b, 38c and 38d which are suitably inclined and fixed in the optical frame 4' so as to lead the image light P' toward the light path 32. Adjacent to, but spaced from the mirror 38b, there is provided an optical lens member 40 with the axis aligned with the image light P'. This optical lens member 40 includes an achromatic lens 42 for increasing the contrast of the image light P.

Positioned above the optical system is a horizontally movable platform 44 slidably supported at the upper portion of the apparatus and including a transparent base plate 46, for example, of a glass plate or the like, which is adapted to receive the original 8 to be copied thereon. This movable platform 44 is reciprocatingly moved by a suitable driving means (not shown), whereby the traverse sections of the original 8 are sequentially scanned to complete the transmission of the entire original 8 on the base plate 46. Before the image light is focused on the photoreceptor surface 2a, the image light passes through a slit s which is controlled by a slit control member 34.

Referring to FIGS. 4, 4a, 5 and 5a, the slit control member 34 comprises a shaft 50 pivotally supported, for example, by the wall of the shield frame 30, with the axis of said shaft 50 being parallel to that of the drum 2, a first blade 52 having rectangular plate-like configuration rigidly supported at the central portion thereof by the shaft 50, with front and rear edges of the blade 52 being parallel to the axis of the shaft 50 and with the rear edge thereof being bent at right angles to the surface of the blade 50 to form a projecting portion 53 and a second blade 54 fixedly mounted at right angles to one surface of the first blade 52 adjacent to the front edge thereof in a direction parallel to the axis of the shaft 50.

The front edge of the blade 54 which thus extends outwardly from the blade 52 has its central portion formed generally parallel to the surface of the blade 52, but has its opposite end portions gradually extending outwardly, as is most clearly seen in FIG. 4, to form a slit width adjusting portion. Normally, the edges of these blades 52 and 54 extend more or less into the optical path 32 to intercept the diffused image light P'. The shaft 50 is rotated by a suitable rotating means (not shown) which can be controlled from the outside of the apparatus. The space between either one of the edges of the blades 52 and 54 and the wall of the shield frame 30 form a slit s the width and shape of which can be varied by rotating the slit control member 34, whereby control of the amount of light exposure with respect to the contrast of the original 8 is effected. When the original has comparatively strong contrast between the bright and dark portions thereof, the slit control member 34 can be rotated to such a position as to form a narrow straight rectangular slit between the edge of the first blade 52 and the wall of the shield frame 30, in which case, the image focused on the photoreceptor surface 2a is quite narrow and hardly any distortion of the focused image occurs, with the image being quite sharp from edge to edge. On the other hand, when the original has comparatively little contrast between the bright and dark portions thereof, the slit control member 34 can be rotated in such a manner as to form a slit which is relatively wide at the central portion thereof between the curved edge of the second blade 54 and the wall of the shield frame 30, in which case, the image formed on the photoreceptor surface 2a is narrowed at its opposite ends and is wide at the central portion thereof. In this case, the distortion of the focused image, due to the elliptical plane of the image receiving surface, can be decreased by reducing the slit width at opposite end portions thereof, which results in a sharp focused image on the photoreceptor surface 2a. When said contrast of the original is normal, the slit control member 34 can be turned halfway to form a slit in which the central portion thereof is formed by the first blade 52 and opposite end portions thereof are formed by the second blade 54.

Referring now to FIGS. 6, 7 and 8, there is shown a modification 34' of the slit control member of FIGS. 4 and 5, wherein like parts are designated by like numbers and the description of similar functions thereof is omitted for brevity.

Instead of the two blades 52 and 54 supported on the shaft 50 as employed in FIGS. 4 and 5, the slit control member 34' includes a rectangular plate 56, having an elongated aperture 57 or opening extending longitudinally in the plate 56, the central portion of the opening 57 being wider than the opposite end portions thereof as is most clearly seen in FIG. 6. On one side of the plate 56 and adjacent to the upper edge, a fin 58 extends outwardly at right angles from the surface of the plate 56. On the other side of the plate 56 and adjacent to the lower edge, another fin 60 extends outwardly at right angles from the surface of the plate 56 and is fixedly or integrally mounted on the plate 56. The outer edges of the fins 58 and 60 are parallel to the surface and corresponding edges of the plate 56. The slit control member 34' has a pair of pins 62 and 64 extending outwardly from the opposite ends of the plate 56 and the axes of the pins 62 and 64 are in alignment with each other, while the end portions of the pins are rotatably journalled in the opposite walls of the shield frame 30, and the axis thereof is parallel to the photoreceptor surface 2a. When the plate 56 is located in such a position that the surface thereof is parallel to the light path, the image light is partially intercepted by the fins 58 and 60, and when the slit control member 34' is suitably rotated about its pins, a narrow slit is formed by the outer edges of fins 58 and 60. When the surface of the plate 56 faces the photoreceptor surface 2a at a position normal to the light path, the slit is formed by the opening 57, in which case, the image light P' is allowed to pass only through the opening 57.

In the modification of FIGS. 6 to 8, the resolution of the image formed on the photoreceptor surface 2a can be controlled from both sides of such image through the opening formed in the blade as compared with the arrangement of FIGS. 4 and 5 wherein control of the resolution of the image is effected from one side through the shaped front edge of the blade member 54. Furthermore, in the control member of FIGS. 6 to 8, the width of the focused image is regulated by two blade members, so that improved resolving power for the image can advantageously be expected.

As is clear from the foregoing description, according to the slit exposure control device directly relevant to the present invention, not only is the width of the slit variable but also the degree of width in one slit is gradually varied from the central portion toward opposite end portions. Therefore, it is possible to obtain a definite and sharp focused image on the drum surface without any serious distortion. The difference in the light intensities in the focused image between the central portion and the opposite end portions of the focused image on the drum surface can be easily eliminated by adjusting the light source member 36, for example, in a manner described hereinbelow.

Referring to FIGS. 9 and 10, the light source member 36 includes an elongated lamp holder 70 fixedly mounted on the frame 4 in a position parallel to the slit, a curved reflecting plate 72 provided on the lamp holder 70, and lamps 74a, 74b and 74c disposed along the reflecting plate 72 and electrically connected in series with each other. The lamps 74a and 74c disposed at the opposite ends of the plate 72 can be so arranged as to have more brightness than the central lamp 74b for providing more light to the opposite end portions of the original 8 to be copied, which causes the image light reflected from the original to become brighter at opposite end portions in comparison to the central portion thereof.

In order to make a more precise adjustment in the light intensity, the light source member 36 may be further provided with light shielding plates 76 disposed in front of the lamps 74a, 74b and 74c, in which arrangement, the opposite end portions of each of the shielding plates 76 are secured to the reflecting plate 72 with screws 78. Furthermore, elongated screw holes (not shown) may be formed in the reflecting plate 72 in a direction parallel to the lamps 74a, 74b and 74c, for enabling adjustment of the positions of the shielding plates 76 in a more precise manner. Instead of providing the shielding plates 76, openings 80, as shown in FIG. 11, may be formed in the reflecting plate 72 behind the lamps 74a, 74b and 74c for adjusting the light intensity of light from the light source member 36.

As fully described hereinabove, according to the slit exposure control device of the invention, the slit control member 34 together with the light source member 36 control the focused image in such a manner that the width of the focused image becomes narrower and brighter toward the opposite end portions thereof, whereby sharp focused images free from any distortion and having sufficient brightness can be obtained even on a photoreceptor drum having a small diameter.

It should be noted that although the present invention has been mainly described with reference to a copying apparatus of the latent image transfer type having a movable platform, the slit exposure control device of the invention is readily applicable to copying apparatuses with a movable optical system, toner powder image transfer type apparatuses or those of any other type wherein a slit exposure system is employed.

Although the present invention has been fully described by way of example with reference to the attached drawings, it is to be noted that various changes and modifications will be apparent to those skilled in the art. Therefore, unless such changes and modifications depart from the scope of the present invention, they should be construed as included therein.

What is claimed is:

1. An electrophotographic copying apparatus of the slit exposure type which comprises:
    a rotatable photoreceptor drum having a photoreceptor surface onto which an image of an original to be copied is projected;
    an optical system including a light source means for illuminating the original and means for projecting the image of the original along a light path toward said photoreceptor drum, said light source means being elongated and including means for causing said light source means to emit more light at opposite end portions thereof than at the central portion; and
    exposure slit means along said light path adjacent said drum and having means for forming a slit parallel to the axis of said drum through which light images of the original are projected onto said photoreceptor surface, said exposure slit means including a slit control member having a blade element pivotally disposed around an axis parallel to the length of said slit for adjusting the width of said slit, said blade element having a slit width adjusting portion the width of which in a direction normal to the axis of rotation of said blade element is uniformly narrow at the central portion thereof and gradually widens toward the opposite ends thereof for providing a slit having a larger width at the center thereof and which gradually narrows toward the ends thereof, said slit width adjusting portion being extended into the light path through said exposure slit means by the pivotal movement of said blade element for adjusting the width of the slit.

2. An electrophotographic copying apparatus as claimed in claim 1, wherein said slit width adjusting portion is at an edge of said blade element extending across the width of said photoreceptor surface.

3. An electrophotographic copying apparatus of the slit exposure type which comprises:
    a rotatable photoreceptor drum having a photoreceptor surface onto which an image of an original to be copied is projected;
    an optical system including a light source means for illuminating the original and means for projecting the image of the original along a light path toward said photoreceptor drum, said light source means being elongated and including means for causing said light source means to emit more light at opposite end portions thereof than at the central portion; and
    exposure slit means along said light path adjacent said drum and having means for forming a slit parallel to the axis of said drum through which light images of the original are projected onto said photoreceptor surface, said exposure slit means including a slit control member having a blade element pivotally disposed around an axis parallel to the length of said slit for adjusting the width of said slit, said blade element having an elongated opening therein the width of which in a direction normal to the axis of rotation of said blade element is wide at the central portion thereof and gradually narrows toward the opposite ends thereof for providing a slit having a larger width at the center thereof and which gradually narrows toward the ends thereof, said blade element lying in the light path through said exposure slit and being pivotally movable therein for adjusting the width of the slit.

4. An electrophotographic copying apparatus as claimed in claim 3, wherein said light source means includes a plurality of lamps electrically connected to each other, and a light shielding plate in front of each of said lamps for adjusting the amount of light emitted therefrom.

5. An electrophotographic copying apparatus as claimed in claim 3, wherein said light source means includes a plurality of lamps electrically connected to each other and a reflecting plate in which said lamps are positioned, said reflecting plate having an opening therein in a position behind each of said lamps for adjusting the amount of light emitted therefrom.

6. An electrophotographic copying apparatus of slit exposure type which comprises an image projecting means for projecting an image of an original for directing it along a path onto a cylindrically curved member having a photoconductive surface, an exposure slit means along said path for forming a slit parallel to the axis of said curved member and through which the image is projected onto said member, said exposure slit means including a wall means and a slit control member mounted adjacent said wall means, said slit control member having a pivotally rotatable blade element extending along and rotatable about an axis transverse to the path of the images and extending into the path of the images toward said wall means for defining a slit therebetween, said blade element having a slit width defining portion which is narrow at its central portion and gradually broadened toward the opposite ends thereof so as to make the slit narrower at the opposite ends than at the middle, said image projecting means including a light source means which is elongated in the direction of said slit, and including means for causing said light source means to emit more light at opposite end portions thereof than at the central portion.

7. An electrophotographic copying apparatus of the slit exposure type which comprises:
    a rotatable photoreceptor drum having a photoreceptor surface onto which an image of an original to be copied is projected;
    an optical system including a light source means for illuminating the original and means for projecting the image of the original along a light path toward said photoreceptor drum, said light source means being elongated and including means for causing said light source means to emit more light at opposite end portions thereof than at the central portion; and exposure slit means along said light path adjacent said drum and having means for forming a slit parallel to the axis of the drum through which light images of the original are projected onto said photoreceptor surface, said exposure slit means including a slit control member having a blade element pivotally disposed around an axis parallel to the length of the slit for adjusting the width of said slit, said blade element having a slit width adjusting portion projecting laterally of said blade element, the width of which portion in a direction normal to the axis of rotation of said blade element is uniformly narrow at the central portion thereof and gradually widens toward the opposite ends thereof for providing a generally curved edge, said slit width adjusting portion being extended into the light path through said exposure slit means by the pivotal movement of said blade element for adjusting the width of the slit to form a slit having a larger width at the center thereof and which gradually narrows toward the ends thereof.

8. An electrophotographic copying apparatus of slit exposure type which comprises an optical system including a light source means for illuminating an original to be copied and means for projecting an image of the original onto a cylindrically curved member having a photoconductive surface, an exposure slit means provided along a projection path of the image for forming a slit parallel to the axis of said curved member and through which the image is projected onto said member, said exposure slit means including a wall means and a blade member adjacent said wall means said blade member having a slit width defining portion which is narrow at its central portion and gradually broadened toward the opposite ends thereof for defining a slit with said wall means, and means for causing more light to pass said opposite ends of said blade member than at its central portion.

* * * * *